P. BALI.
CONVERTIBLE PICKAX.
APPLICATION FILED MAR. 9, 1918.
1,279,075.
Patented Sept. 17, 1918.
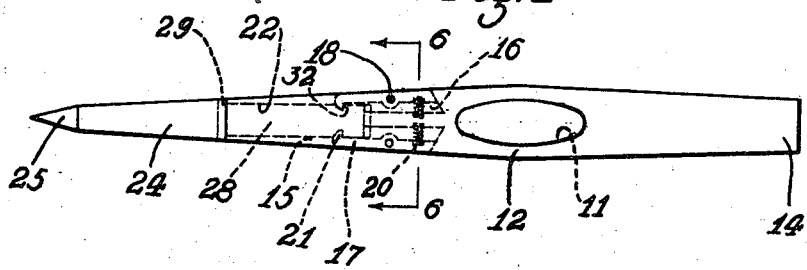
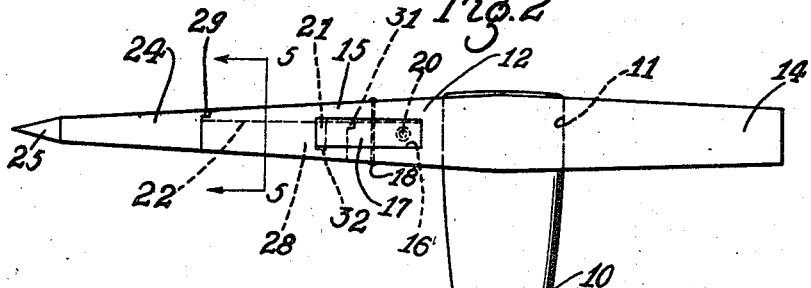
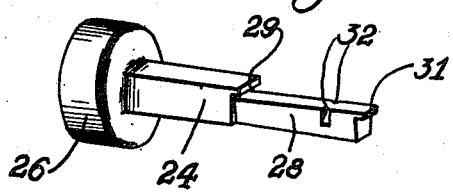
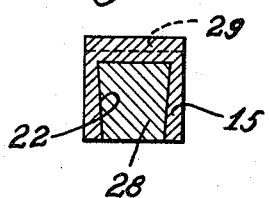
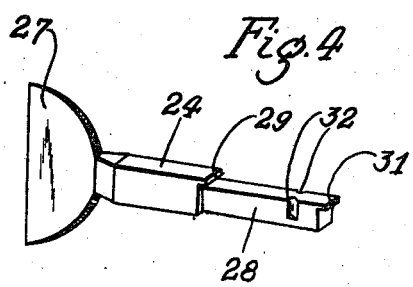
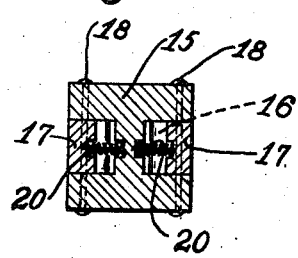
INVENTOR
Philip Bali
BY
ATTORNEY

UNITED STATES PATENT OFFICE.

PHILIP BALI, OF PORTAGE, PENNSYLVANIA.

CONVERTIBLE PICKAX.

1,279,075.  Specification of Letters Patent.  Patented Sept. 17, 1918.

Application filed March 9, 1918. Serial No. 221,402.

*To all whom it may concern:*

Be it known that I, PHILIP BALI, a subject of the King of Hungary, resident of Portage, county of Cambria, and State of Pennsylvania, have invented certain new and useful Improvements in Convertible Pickaxes, of which the following is a specification.

This invention relates to improvements in the heads of manually operable implements of the pickax or hammer type.

The principal object of the invention is to provide an implement in which the parts adapted for impact or concussion are interchangeably held within the head of the implement.

A further object is to provide an implement in which the connecting elements may be readily interchanged, the same being held in a secure and rigid manner when within the head.

A still further object is to provide a tool of simple construction having interchangeable elements in which no peculiar or objectionable appearance is presented.

These and other like objects are attained by the novel construction and combination of parts hereinafter described and shown in the accompanying drawing, forming a material part of this disclosure, and in which—

Figure 1 is an end elevational view showing an implement made in accordance with the invention.

Fig. 2 is a side elevational view of the same.

Fig. 3 is a perspective view showing one form of the interchangeable head.

Fig. 4 is another view of interchangeable head.

Fig. 5 is a transverse sectional view taken on line 5—5 of Fig. 2, and

Fig. 6 is a similar transverse sectional view taken on line 6—6 of Fig. 1.

Like other tools of this type the implement comprises a handle 10, usually made of wood and of such length as to be conveniently operated, the same being engaged at its end in the eye 11, of the head 12; one of the ends 14, being plain and used for any purpose for which it may be adapted. The other end 15, has formed upon opposite sides recesses 16, in which are engaged opposed pawls 17, by means of pins 18, the flat level outer surfaces of which are held extended flush or level with the heads 12, by means of coiled compression springs 20.

The recesses 16 are undercut in their ends next to the handle 10, while the corresponding ends of the pawls are similarly formed so as to prevent the springs 20 from pressing them beyond the level surface of the head.

The opposite ends of the pawls are formed with detent hooks 21, which extend into a longitudinal recess 22, formed in the lower portion of the head 15, the same being open at its bottom and outer end and having its side walls beveled or dovetailed outwardly as is best seen in Fig. 5.

The operative elements of the implement consist of a shank 24, formed at one extremity with points corresponding to those of a pickax 25, hammer head, 26, or blade, 27, similar to an ax or hatchet, while extending in an opposite direction from the shank 24, is a stem 28 having beveled sides adapted to be inserted within the recess 22, to which they are accurately fitted.

Formed with the shank 24, is an overhanging ledge 29, suited to a corresponding transverse recess provided in the extreme front end of the head 15, above the longitudinal recess 22. A corresponding ledge 31, is formed at the extremity of the stem 28, engageable with a like recess provided in the head and formed in opposite sides of the stem 28, are slots 32, receptive of the detent hooks 21 of the pawls.

The operation of changing from one point to another is as follows. Pressure being applied to the outer ends of the pawls 17 upon each side, so as to overcome the pressure of the springs 20, the detent hooks 21, are raised outward from the slots 32, and a pull exerted on the stem 24, causes a separation of the parts so that the points can be renewed or a point of a different shape inserted, the insertion being accomplished by merely pressing the stem 28, into the recess 22, until the detents 21, engage with the slots 32, holding the points in a rigid operative position.

Having thus described my invention what I claim as new and desire to secure by Letters Patent is:—

In a tool of the character described, having interchangeable points, the combination with a handle and a head rigidly affixed transversely thereto, said head having an undercut slot extending inwardly from one end thereof, and being open at the bottom, undercut recesses formed upon opposite sides of the head, hooked detents engaged in said recesses having flat, level outer faces resting against the walls of said recesses and undercut ends engaging the undercut recesses, coiled springs engaging the opposite inner faces of said detents at their ends distant from the hooks for keeping these ends apart and tending to close the hooks, a point having a shanked stem suited to said slot, recesses in said stem in which the hooked ends of said detents may be engaged, and ledges formed at the ends of said stem and shank, said ledges being receivable within corresponding recesses formed in said head, substantially as described and for the purpose set forth.

In testimony whereof I have affixed my signature.

PHILIP BALI.